United States Patent

[11] 3,604,848

[72] Inventor Carl R. Driskell
Winter Park, Fla.
[21] Appl. No. 31,953
[22] Filed Apr. 27, 1970
[45] Patented Sept. 14, 1971
[73] Assignee The United States of America as represented by the Secretary of the Navy

[54] PERISCOPE BREAKWATER SYNTHESIZER
5 Claims, 2 Drawing Figs
[52] U.S. Cl. .................................................. 178/6.8,
35/11, 178/DIG. 35
[51] Int. Cl. .................................................. H04n 7/18
[50] Field of Search ........................................... 178/6.8,
DIG. 20; 35/11

[56] References Cited
UNITED STATES PATENTS
3,258,855 7/1966 Flower et al. ................. 178/DIG. 20

Primary Examiner—Robert L. Griffin
Assistant Examiner—Richard K. Eckert, Jr.
Attorneys—Richard S. Sciascia, John W. Pease and John F. Miller ABSTRACT: Electronic means for automatically changing the illumination of the view observed through the periscope of a submarine periscope view simulator training device as the simulated depth of the periscope is changed. As an ascending periscope approaches the surface of the sea from below, the illumination of the periscope view increases at a rate related to the rate of ascent from darkness to a higher value at a position just below the surface. As the periscope breaks through the surface, full illumination is provided and the scene at the surface becomes visible. A reverse sequence is followed when a periscope descent is made. The invention provides means for simulating the changes in illumination observable in a periscope during the simulation of both ascents and descents.

PATENTED SEP 14 1971 3,604,848

Carl R. Driskell
INVENTOR

By John F. Miller
John W. Pease
Agent

Attorney 3,604,848

PERISCOPE BREAKWATER SYNTHESIZER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention is in the field of training devices, more specifically, simulator training devices which simulate operative equipment and, in some cases, the operating environment. As equipment increases in complexity and cost, it becomes increasingly necessary that some kind of training device be developed for simulating the operating controls and the operating environment wherein operating personnel can be trained without the hazard and expense of providing the actual equipment for practice. For example, airplanes, ships, submarines, and other devices are so complex and expensive that it is no longer practicable to allow a trainee pilot to practice with the actual craft. Furthermore, great risks to life and property are incurred when inexperienced personnel operate real airplanes, submarines, etc. Therefore, simulator type training devices have been developed for practically all kinds of equipment which require skilled operating personnel.

One of the most useful simulator type training devices now available is the periscope view simulator, designed for training submarine personnel in the use of a periscope. A periscope is the eyes of a submarine and the military effectiveness of a submarine is to a large extent dependent on the skill of periscope operating personnel.

Applicant's invention is particularly suitable for use with the electronic periscope view simulator disclosed by Hanns H. Wolff in U.S. Pat. Nos. 3,479,454 and 3,420,953. No means are provided in the Wolff and other prior art simulators for changing the illumination observable as the periscope depth is changed. The invention overcomes this limitation of the prior art with a novel and effective circuit which greatly enhances the realism of the simulation achieved with a periscope view simulator.

SUMMARY OF THE INVENTION

The invention provides electronic circuitry for changing the illumination of the scene observed through the periscope of a periscope view simulator as the simulated periscope depth is changed. Means are connected to the submarine periscope depth controls for generating an analog voltage signal proportional to the distance below the surface of the periscope. This signal is compared with a reference signal in a comparator which develops an output voltage which controls a video gating system. The video gating system controls the supply of video information signals to a television monitor which displays a scene which is observed through the simulator periscope. The video gating system also controls the supply of the depth proportional analog voltage signal to the television monitor to vary the illumination of the scene displayed. The arrangement is such that the illumination of the scene varies from darkness at great periscope depths to progressively more light as the depth is decreased to simulate the approach of an ascending periscope towards the brighter waters nearer the surface. When the magnitude of the depth proportional analog signal reaches a predetermined "surface" value simulating the breaking of the surface by the periscope head, the scene is fully illuminated and a video information signal from a video combining means of the simulator is gated to the television monitor to create a surface view which may be observed through the periscope.

DESCRIPTION OF THE PREFERRED EMBODIMENT

Figure 1:
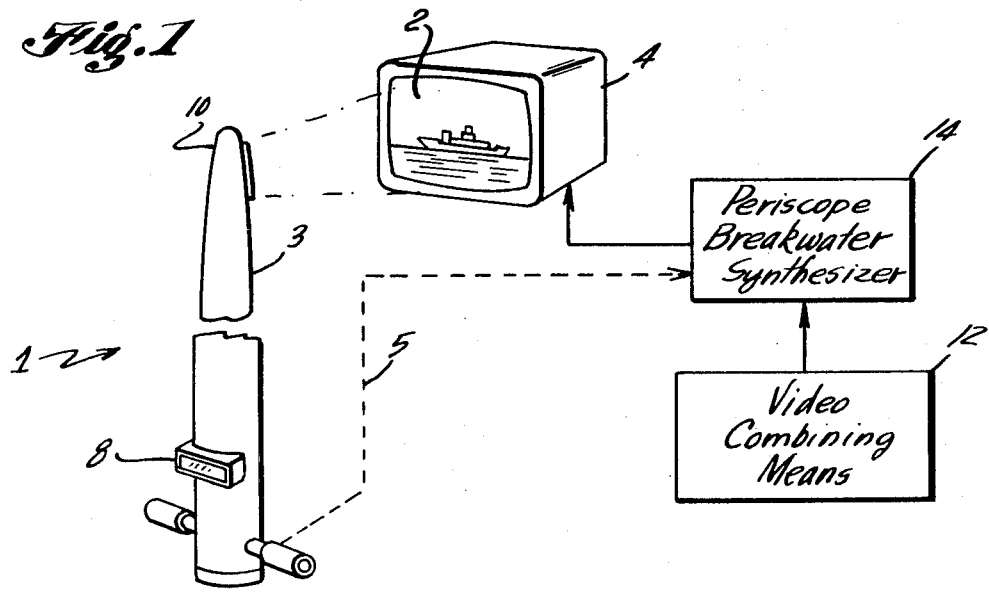
FIG. 1 illustrates the environment of the invention.

FIG. 1 shows a part of a periscope view simulator such as the "Electronic Synthesizer" described in U.S. Pat. No. 3,479,454 to Hanns H. Wolff. The invention is adapted for use with such a simulator. In the periscope view simulator, a periscope 1 is arranged to view a scene 2 displayed periscope a television monitor 4. The scene 2 may comprise a seascape containing one or more objects such as ships, or any other scene typical of those observable through the periscope of a real submarine. Generally, the scene displayed is a dynamic seascape containing several objects such as ships, planes, etc., which are caused to maneuver against the sea-sky background in a realistic manner.

Periscope 1 may comprise a head or top portion 10, a body or tube 3, an eyepiece 8 through which an operator trainee looks to see scene 2, and a periscope height control 6 which is connected to the circuits of the invention. This operative connection is shown as the dashed line connecting 6 to the periscope breakwater synthesizer 14. The video information signal from which television monitor 4 derives the displayed scene 2 is furnished by a video combining means 12 which is described in the aforementioned patent to Hanns H. Wolff. Periscope breakwater synthesizer 14 gates the video signal from the video combining means 12 to monitor 4 in accordance with the position of periscope depth control 6 and generates and gates a monitor illumination control voltage to monitor 4. It should be understood that periscope height control 6 which ordinarily controls the height of periscope head 10 above the body of a submarine may be combined with submarine depth controls in the periscope view simulator in such manner that the signals forwarded to periscope breakwater synthesizer 14 are proportional to the simulated depth of head 10 below the sea surface. This is a function of both the depth of the submarine and the elevation of the periscope head above the submarine. However, to simplify this explanation, the simulated submarine depth will be maintained constant a few feet below the surface and the periscope raised and lowered through the surface.

As described in the aforementioned patents, the "Electronic Synthesizer" provides means for causing objects such as ships, planes, etc., in scene 2 to move across the scene, to advance toward the observer, to move beyond the horizon, etc., and to perform any maneuver which a real ship or plane can perform. A trainee periscope operator looking into an eyepiece 8 of periscope 1 can observe and track the ships, planes, and other objects in scene 2, aim torpedoes, and generally manipulate periscope 1 in the same manner, with the same results, as are obtained by manipulating a real periscope in a real-life submarine at sea. Thus, a trainee may obtain invaluable experience in operating a periscope without the risk and expense of using an operational submarine. The simulation achieved is so realistic that for practical purposes the training accomplished in the periscope view simulator is as effective as that attained using a real submarine.

However, one important factor of complete realism has not been attained in the prior art simulation heretofore. This is the factor now supplied by applicant's invention, i.e., simulation of the changing light conditions seen through a periscope as it approaches or leaves the surface of the sea. When a submarine is deeply submerged, the scene viewed through periscope eyepiece 8 is dark. When the submarine periscope rises toward the surface, the scene grows lighter as waters near the surface obtain more light than those farther below. When the periscope head breaks the surface, the total illumination available, whether it be daylight or the darkness above the surface, is seen through the periscope. When the periscope is lowered beneath the surface, a reverse sequence of decreasing illumination is observed.

Figure 2:
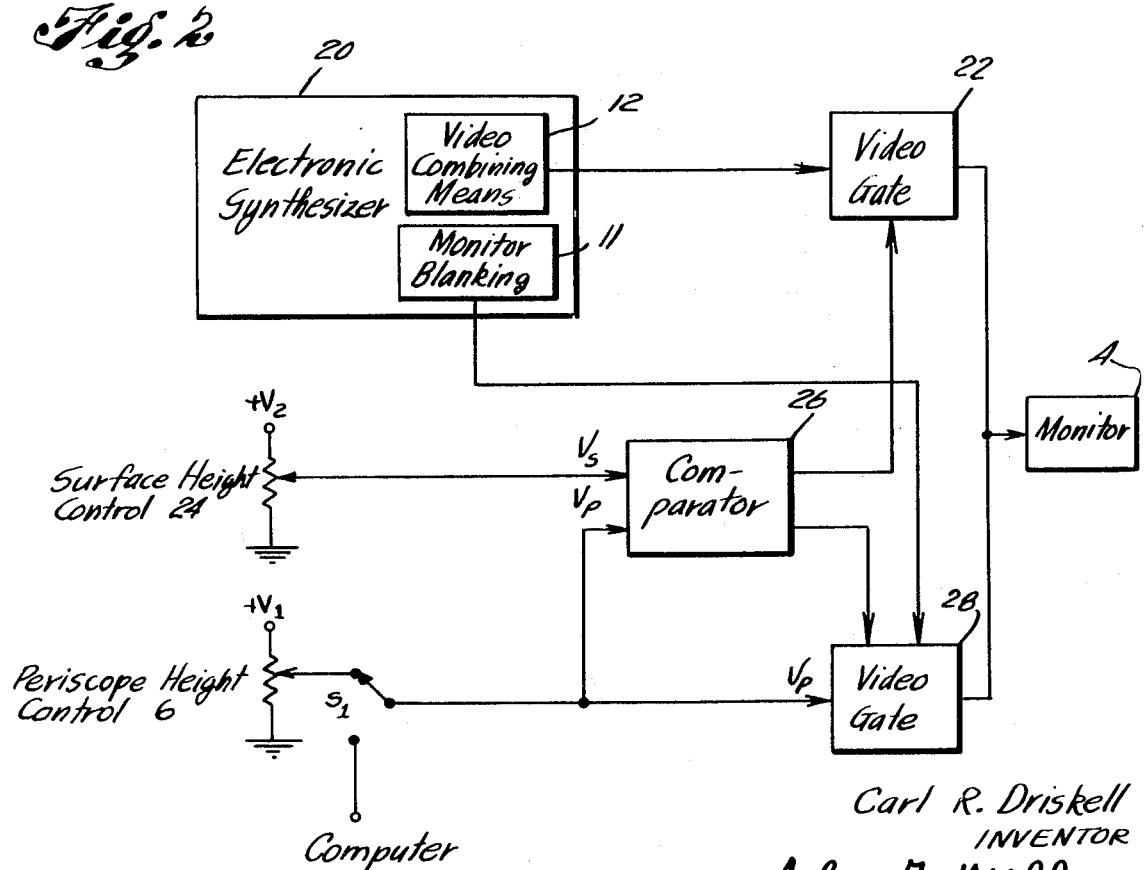
FIG. 2 is a block diagram showing the principles of the invention.

The invention achieves this improved simulation by means of the apparatus shown in detail in FIG. 2. Here is shown the electronic synthesizer 20 which contains among other elements the video combining means 12 discussed in the explanation of FIG. 1. A video output signal from 12 is gated by a first video gate 22 to television monitor 4. The video output signal from 12 may be a composite signal derived from several sources, for example, several TV cameras. It may contain information representing a background scene, several ships, planes, etc. The means by which the video signal is generated is not a part of this invention but is described in the previously mentioned patents.

Periscope height control 6 is shown in FIG. 2 for the purpose of illustration as a potentiometer supplied by a positive voltage source $V_1$. As periscope height control 6 is adjusted, a proportional output voltage $V_p$ from 6 is supplied to a comparator 26 and to a second video gate 28. A surface height control potentiometer 24 supplied by a voltage $V_2$ may be adjusted to a surface height level to develop a proportional output voltage $V_s$ which is supplied to a second input of comparator 26 over the line shown.

The voltages $V_p$ and $V_s$ are compared in comparator 26. $V_s$ will have a value determined by the surface height selected and $V_p$ will have some value at or above a zero reference level at which no light reaches the periscope. If $V_s$ is greater than $V_p$, comparator 26 will develop output voltages which inhibit video gate 22 and actuate video gate 28 to pass the voltage $V_p$ to control the illumination of monitor 4. Thus, when the periscope height control 6 is such that the periscope is at or below the level at which no light reaches the periscope, the magnitude of $V_p$ passed to control the monitor is such that the monitor screen is dark. As the periscope height is increased, $V_p$ will increase to gradually brighten the screen of the monitor. As the periscope height control is adjusted upwards gradually to simulate an "up periscope" operation, $V_p$ progressively brightens the screen of monitor 4 until, when $V_p$ equals $V_s$, comparator 26 reverses its output voltages to inhibit video gate 28 and enable video gate 22. Then $V_p$ is blocked at gate 28 and the video signal from video combining means 12 is applied to monitor 4, causing the monitor to display the scene generated by the apparatus of electronic synthesizer 20.

This procedure realistically simulates the gradual brightening of the view seen through a periscope as the periscope approaches the surface from below, and the sudden appearance of the surface scene as the periscope breaks through the surface of the water. This makes it possible for submarine personnel to obtain realistic practice in the vital "up periscope" maneuver. It is essential to successful submarine operations that personnel be thoroughly drilled and highly skilled in performing this essential operation in order to quickly raise periscope and survey the surrounding sea for hostile craft. The success of the submarine mission depends largely on the ability to immediately sight the enemy and determine the attack or escape tactics indicated. Since it makes this essential drill practicable, the importance of the invention is vastly greater than its relative complexity might indicate.

A monitor blanking means 11 is shown connected to an inhibiting input of video gate 28. This provides a monitor blanking signal generated in the electronic synthesizer to interrupt the voltage $V_p$ when gate 28 is enabled to pass $V_p$ by the output voltage of comparator 26. This is done because the video channels of the standard closed circuit television monitor employed are AC coupled. The interruption of $V_p$ at the blanking rate makes it possible to couple the DC voltage $V_p$ through AC components.

The electronic synthesizer may be computer controlled. The voltage $V_p$ may be obtained directly from the simulator computer by moving the arm of the switch $S_1$ to its lower contact, thus connecting the computer in the circuit and breaking the circuit from the manual periscope height control 6.

What is claimed is:

1. In an electronic periscope view simulator training device having a periscope, video information generating means, and television monitor means for presenting said video information in a view observable through said periscope, the improvement comprising:
   periscope height control means for simulating raising and lowering of said periscope to thereby change the depth of said periscope with respect to a surface level, means for developing a periscope height voltage proportional to the simulated height of said periscope, and means to selectively apply said periscope height voltage to said television monitor to selectively darken said television monitor an amount proportional to said simulated periscope height.

2. The apparatus of claim 1, and including means for blocking said video information from said television monitor when said periscope height control is below a predetermined surface height.

3. The apparatus of claim 2, and including surface height control means for determining said surface height, means for developing a surface height voltage proportional to said surface height, and comparing means for comparing said surface height voltage and said periscope height voltage to thereby control said television monitor.

4. The apparatus of claim 3, and including gating means for gating said video information to said television monitor and said periscope height voltage to said monitor, means connecting said comparing means to control said gating means whereby said video information is blocked from said monitor and said periscope height voltage is gated to said monitor when said periscope height is less than said surface height, and whereby said video information is gated to said monitor and said periscope height voltage is blocked from said monitor when said periscope height is greater than said surface height.

5. The apparatus of claim 4, said gating means including a first gate for gating said video information to said monitor and a second gate for gating said periscope height voltage to said monitor, said video information generating means including a monitor blanking means, and means connecting said monitor blanking means to said second gate, whereby a monitor blanking voltage is supplied to said second gate to interrupt said periscope height voltage in order to AC couple said periscope height voltage to said monitor.